Figure 3:
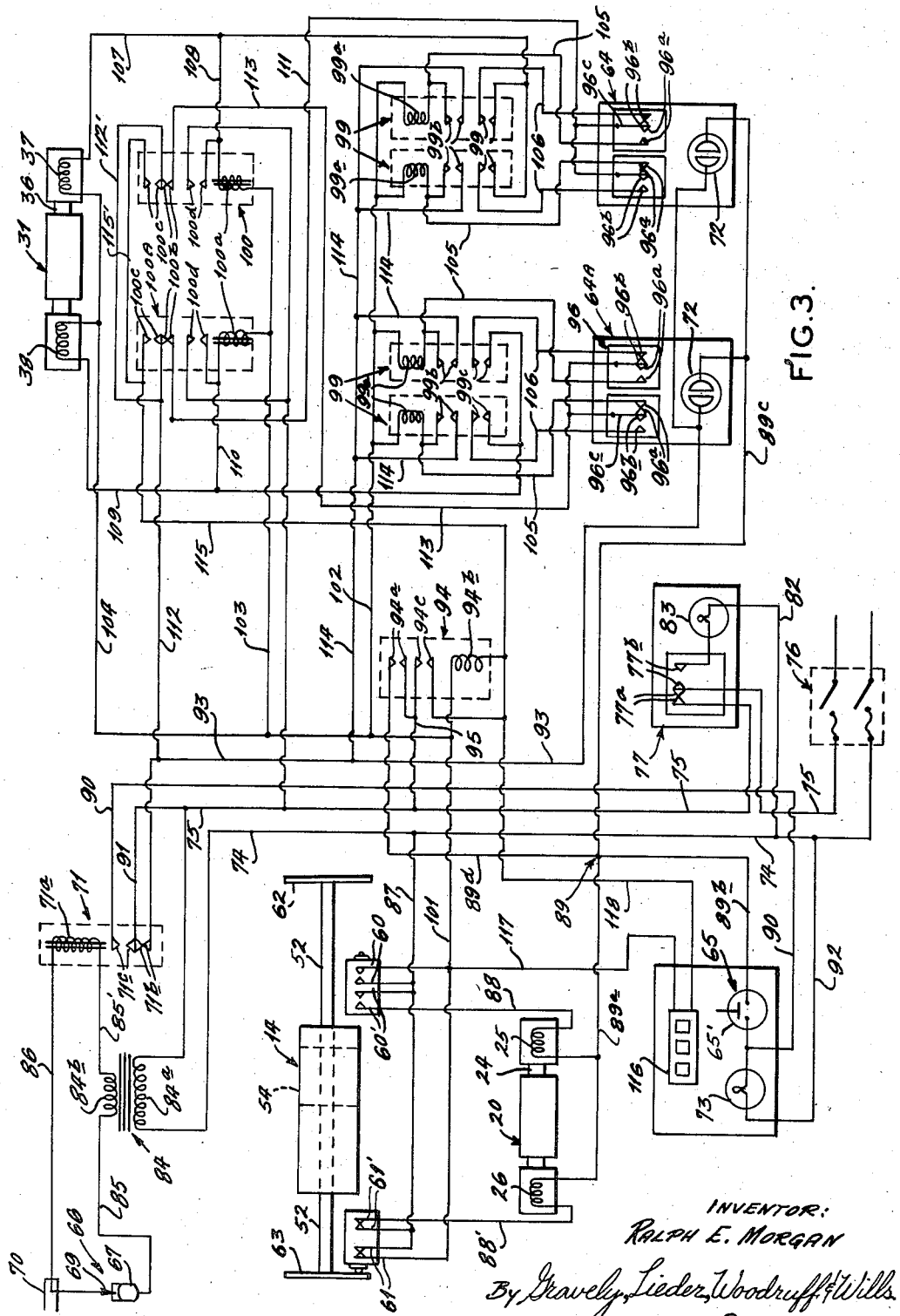

April 21, 1959
R. E. MORGAN
2,882,999
APPARATUS FOR MEASURING LUBRICANT OR THE LIKE
Filed June 21, 1956
2 Sheets-Sheet 1
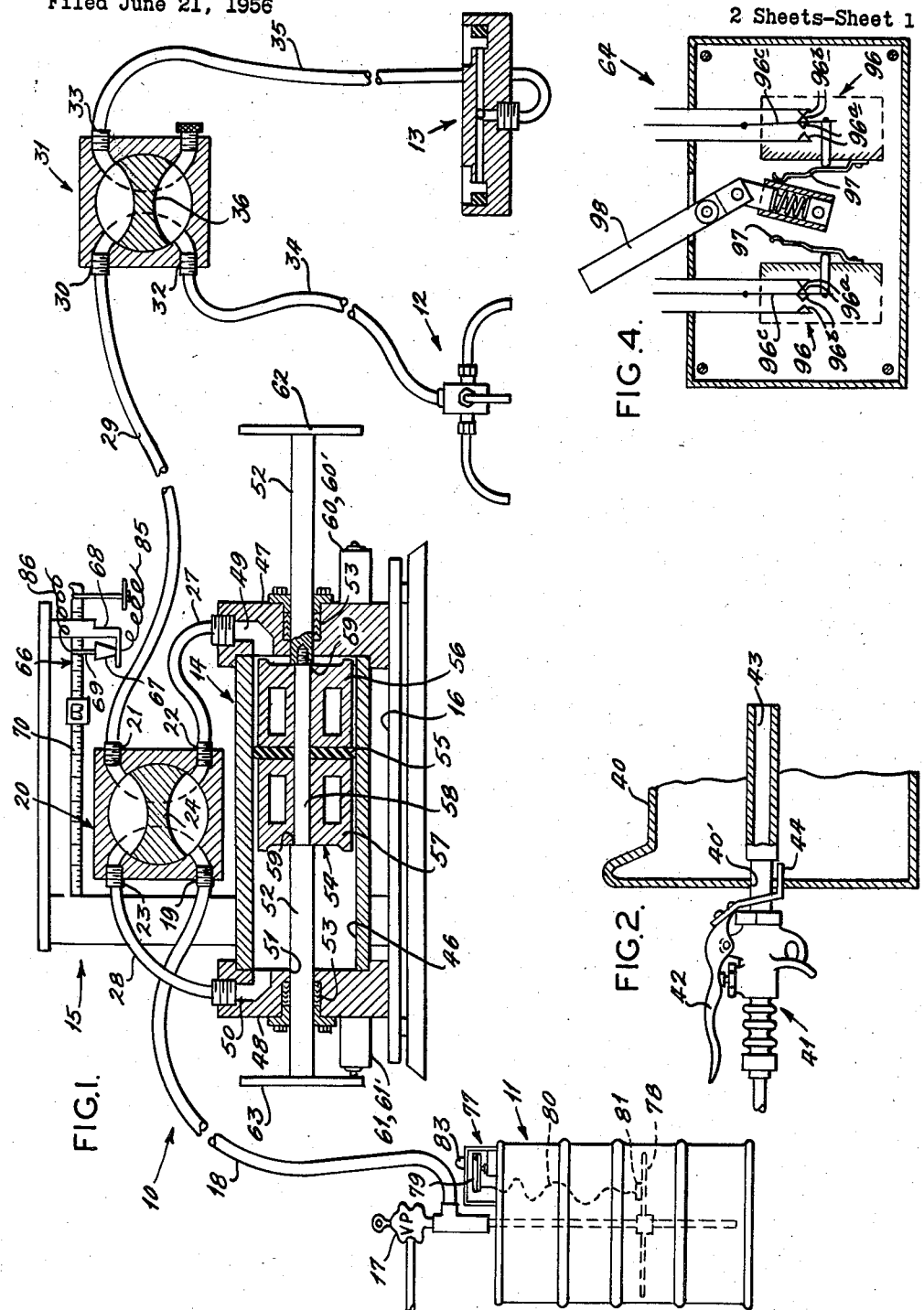
INVENTOR:
RALPH E. MORGAN
By Gravely, Lieder, Woodruff & Wills.
ATTORNEYS.

April 21, 1959

R. E. MORGAN 2,882,999

APPARATUS FOR MEASURING LUBRICANT OR THE LIKE

Filed June 21, 1956

2 Sheets-Sheet 2

INVENTOR:
RALPH E. MORGAN

By Gravely, Lieder, Woodruff & Wills
ATTORNEYS.

ical circuit.

United States Patent Office 2,882,999
Patented Apr. 21, 1959

2,882,999

APPARATUS FOR MEASURING LUBRICANT OR THE LIKE

Ralph E. Morgan, Canton, Ohio, assignor to The Timken Roller Bearing Company, Canton, Ohio, a corporation of Ohio Application June 21, 1956, Serial No. 592,901

9 Claims. (Cl. 184—7)

This invention relates generally to measuring devices and more particularly to an improved apparatus for measuring and dispensing lubricant by volume and weight.

The principal object of the present invention is to provide an apparatus for measuring a predetermined amount of lubricant from a primary source and delivering it to a dispensing mechanism.

Another object is to provide a measuring device adapted to measure a predetermined volume of lubricant from a source and simultaneously to weigh the lubricant to assure the desired volume has been obtained.

Another object is to provide an apparatus for measuring lubricant by volume and by weight wherein the device is electrically controlled and operated so that successive and equal amounts of lubricant are measured.

Another object of the present invention is to provide a measuring device for measuring a predetermined amount of lubricant and electrical means for indicating whether or not the desired amount of lubricant has been measured.

These and other objects and advantages will become apparent hereinafter.

Briefly, the invention comprises an apparatus including a lubricant reservoir connected through a pump to the inlet of a four-way valve, a measuring cylinder having a piston reciprocably positioned in its bore, feed lines connecting the four-way valve to opposite ends of the measuring cylinder, nozzle selecting means connected to the outlet of the four-way valve, and a nozzle connected to each outlet of the nozzle selecting means. The invention also comprises a scale having the measuring cylinder mounted thereon, and an electrical circuit operatively associated with the apparatus to control the reciprocation of the piston, to energize the nozzle selecting means to deliver lubricant to the proper nozzle and to indicate when the scale is balanced or unbalanced.

The invention also consists in the parts and in the combinations and arrangements of parts hereinafter described and claimed. In the accompanying drawings which form a part of this specification and wherein like numerals refer to like parts wherever they occur:

Fig. 1 is a diagrammatic view of the measuring apparatus embodying the teachings of the present invention, and showing two nozzles through which lubricant may be dispensed, Fig. 2 is a sectional view showing another typical dispensing nozzle adapted to be used with the apparatus in Fig. 1, Fig. 3 is a schematic view showing the electrical circuit for the measuring apparatus, the piston of the measuring cylinder being shown at the end of its rightward stroke, and Fig. 4 is a view of a toggle control switch for operating the electrical circuit.

*Mechanical*

Referring to Fig. 1 of the drawings, an apparatus 10 constructed in accordance with the teachings of the present invention comprises a lubrication system for measuring a predetermined amount or volume of lubricant or like fluid from a reservoir 11 and for selectively feeding it to one of two dispensing nozzles or fixtures 12 or 13, which is adapted to distribute the lubricant to bearings (not shown). The measuring portion of the apparatus includes a lubricant volume measuring cylinder 14 and a lubricant weighing beam scale 15 or the like, the measuring cylinder 14 being mounted in any suitable manner on the platform 16 of the scale 15.

The lubrication system also includes a pump 17 for forcing lubricant under pressure from the reservoir 11 into a conduit 18 having one end connected to the pump outlet. The other end of the conduit 18 is connected to the inlet port 19 of a distributor valve 20, which is preferably a four-way valve wherein the inlet port 19 and an outlet port 21 are alternatively connected to different intermediate of feed ports 22 and 23 by the intermittent oscillation of a valve armature 24. The oscillation of the armature 24 is effected by the alternate energization of solenoids 25 and 26, which are positioned at the right and left-hand ends of the armature 24 (Fig. 3). The feed port 22 of the valve 20 is connected to the right-hand end of the measuring cylinder 14 by a conduit 27, and a conduit 28 connects the feed port 23 to the left-hand end of the measuring cylinder 14. Another conduit 29 connects the outlet port 21 of the valve 20 to the inlet port 30 of a fixture selecting valve 31, which is preferably a three-way valve having outlet ports 32 and 33. These ports 32 and 33 are adapted to be selectively connected to the inlet port 30 whereby lubricant is fed to one of the fixtures 12 or 13 through conduits 34 or 35, respectively. The armature 36 of the valve 31 is provided with solenoids 37 and 38, energization of the solenoid 37 moving the armature 36 to connect the inlet port 30 to the outlet port 32, conduit 34 and fixture 12 whereas energization of the solenoid 38 moves the armature 36 to connect the inlet port 30 to the outlet port 33, conduit 35 and fixture 13. The fixtures 12 and 13 are adapted for lubricating an assembled cone spacer (not shown) and a cone and roller assembly (not shown), respectively. Of course, fixtures may be provided for lubricating objects other than bearings or other liquids than lubricant can be measured by the present apparatus 10.

Another use for which the apparatus 10 is especially adapted is measuring a predetermined amount of lubricant to bearings mounted in a journal box 40 of a railroad car axle, see Fig. 2. For such a use, a nozzle 41 may be connected directly to the outlet conduit 29 of the four-way valve 20. It is to be understood that a pair of nozzles 41 may be connected to the outlet ports 32 and 33 of the valve 31 for alternate use in lubricating journal boxes 40, as will become apparent hereinafter by the description of the operation of the apparatus 10 with regard to the fixtures 12 and 13. The nozzle 41 includes a valve lever 42 which is depressed to open an internal valve (not shown) so that measured lubricant will flow into the journal box 40 from the lubrication system. The nozzle 41 is provided with an outlet tube 43 which is positioned in the journal box opening 40′ and through which the lubricant flows from the system. The valve lever 42 has an extension 44 adapted to abut the tube 43 when the valve lever 42 is depressed so that by inserting the tube 43 further into the opening 40′, the extension 44 will be positioned therebetween and the lever 42 will be retained in valve open position.

Referring now to the measuring portion of the apparatus 10 in Fig. 1, the measuring cylinder 14 includes a central bore 46 having right and left-hand end closure blocks or cylinder heads 47 and 48. The end blocks 47 and 48 are provided with passages 49 and 50 in communication with the bore 46 and to which the conduits 27 and 28, respectively, are connected. Each of the end blocks is also provided with a centrally located bore 51 through which a piston rod 52 extends outwardly of each end of the measuring cylinder 14, suitable sealing means 53 being provided between the piston rod 52 and the bores 51 of the end blocks 47 and 48.

A piston assembly 54 is secured between the piston rods 52 and includes a resilient member 55 in sliding sealing contact with the bore wall 46, and follower blocks 56 and 57 positioned on the right and left-hand sides, respectively, of the member 55 for supporting it therebetween. The piston assembly 54 is positioned on a connecting rod 58 to which each of the piston rods 52 are removably secured, each of the piston rods 52 forming a radial shoulder 59 with the connecting rod 58 so that the piston assembly 54 is retained therebetween. It is apparent from Fig. 1 that the flow of lubricant through the conduit 27 and passage 49 into the bore 46 to the right of the piston assembly 54 will cause the piston assembly to move to the left in the bore 46. It is also obvious that any lubricant in the bore 46 to the left of the piston assembly 54 will be forced out of the cylinder 14 during this leftward movement, the lubricant thus passing through the conduit 28, the valve 20, the conduit 29 and the valve 31 to one of the fixtures 12 or 13, or to the nozzle 41. Similarly, when the piston assembly 54 is positioned at the left-hand end of its stroke, and the four-way valve 20 is reversed so that the conduit 28 connects the reservoir 11 with the passage 50, lubricant will be forced into the bore 46 of the cylinder 14 to the left of the piston assembly 54 and the lubricant previously measured in the cylinder to the right of the piston assembly will be forced out of the cylinder into the conduit 27 and to the dispensing nozzle.

The volume of lubricant measured by the cylinder 14 is regulated or determined by the length of the piston stroke in either direction. Accordingly, the length of the follower blocks 56 and 57 is predetermined so that the reciprocation of the piston assembly 54 will be limited by the alternate abutment of the blocks 56 and 57 with the end blocks 47 and 48, respectively. The volume of lubricant measured by the cylinder 14 is thus determined by the size of the follower blocks 56 and 57 and it is apparent that, by changing follower blocks, different volumes of lubricant can be measured. The measuring cylinder 14 is also provided with normally open right and left-hand double pole limit switches 60, 60' and 61, 61'. The switches 60, 60' and 61, 61' are alternately closed by trip plates 62 and 63 carried on the right and left-hand ends of the piston rods 52 equidistant from the member 55 of the piston assembly 54, or from the adjacent ends of the follower blocks 56 and 57, respectively. The length of the piston rods 52 is determined by the length of the follower blocks 56 and 57 so that one of the limit switches is closed at the same instant the piston assembly 54 abuts one of the end blocks at the end of its stroke. As will appear hereinafter, the limit switches are part of the electrical circuit for controlling the operation of the apparatus 10, and one of these switches must be closed at the end of each piston stroke to assure the continued operation of the apparatus. Therefore, the piston stroke is determined by the length of the piston rods 52 as well as the follower blocks 56 and 57, and a different volume of lubricant can be provided by removing one end block and substituting a new piston and piston rod assembly in the cylinder 14.

It is now apparent that lubricant is pumped from the reservoir 11 through the valve 20 alternately to opposite ends of the measuring cylinder 14 to effect the reciprocation of the piston assembly 54 therein, the movement of the piston in each direction forcing a previously measured amount of lubricant back through the valve 20 and to one of the dispensing nozzles 12, 13 or 41. For instance, the rightward stroke of the piston assembly 54 in the cylinder 14 is effected by the energization of the right-hand solenoid 25, the stroke being stopped by the abutment of the follower block 56 with the right-hand end block 47. Simultaneously, the limit switch 61, 61' at the left-hand end of the cylinder 14 is contacted and closed by the trip plate 63 so that the solenoid 26 will be conditioned for energization to reverse the position of valve armature 24 and connect the inlet conduit 18 with the feed conduit 27 so that the leftward stroke of the piston assembly 54 will be effected when the left-hand solenoid 26 is energized. However, the actual energization of the solenoids 25 and 26 is dependent upon the manual operation of either a control unit 64 or a reject unit 65 to be described presently. It is also obvious that the lubrication system will have residual fluid or lubricant in the conduits 18, 27, 28, 29, 34 and 35 and the valves 20 and 31 at all times. However, the amount of lubricant dispelled from the system will be the same as the amount of lubricant measured in the cylinder 14 during the last stroke of the piston assembly 54 therein.

The beam scale 15 having the measuring cylinder 14 mounted on its platform 16 is provided with a dash-pot type switch 66 including a mercury pot contact 67 or the like secured to the standard 68 of the scale 15, and a silver bar contact 69 or the like fixed to the beam 70 of the scale 15 and movable therewith. The pot 67 and bar 69 are vertically aligned and the beam 70 is weighted so that when the cylinder 14 contains a full volume of lubricant the tip of the bar 69 is positioned immediately adjacent to—but not touching—the mercury in the pot 67. Allowable variations in the weight of the lubricant to be measured may then be provided by adjusting the beam weight to a lower increment, such as one-quarter pound. If desired, the valve 20 may also be mounted on the scale 15 above the cylinder 14 whereby shorter conduits therebetween may be provided.

At the end of each piston stroke measuring a full amount of lubricant, the dash pot switch 66 will remain open and the switch of the control unit 64 will be operative to energize the solenoid 25 or 26. The control unit 64 is also operative to energize one of the solenoids 37 or 38 for delivering lubricant through the valve 31 to the preselected fixture 12, 13 or 41. Energization of the solenoid for the valve 20 causes the piston assembly 54 to be moved in the cylinder 14 to measure another amount of lubricant and simultaneously force the previously measured lubricant out of the cylinder 14 to the dispensing fixture. However, if the lubricant measured is less than the allowable variation in weight, the contacts 67 and 69 of the dash-pot switch 66 will close to energize a relay 71, which renders the control unit 64 inoperative and simultaneously conditions the switch 65' of the reject unit 65 for operation. Accordingly, the lubricant can only be ejected or dispelled from the apparatus 10 by closing the reject switch 65' so that the operator cannot accidentally discharge an insufficient amount of lubricant into a journal box 40 or on a bearing (not shown). The control and reject units 64 and 65 include indicator lights 72 and 73, respectively, so that the operator can instantly observe which of the units is operative and whether or not a full amount of lubricant has been measured.

The mechanical features of the apparatus 10 also includes a lubricant level limit switch 77 associated with the lubricant reservoir 11 for disabling the electrical circuit when the lubricant in the reservoir drops to a predetermined level. The reservoir 11 is provided with a follower plate 78, which forms a sliding wall exerting a pressure on the surface of the lubricant in the reservoir 11 thereby preventing the formation of air pockets in the lubrication pumped into the apparatus 10. The switch 77 is mounted on the reservoir 11 and is operated by a trip mechanism including a pivotally mounted arm 79 having a wire 80 or the like connected to its free end, the wire 80 extending into the reservoir 11 and being attached to a weight 81 positioned on the follower plate 78. The length of the wire 80 is preselected so that when the follower plate 78 has dropped to the predetermined level in the reservoir 11, the weight will depend from the arm 79 exerting a sufficient force thereon to cause the switch 77 to be operated and the electrical circuit to be disabled as will be presently described.

Referring to Fig. 3 it will be seen that the measuring cylinder 14, the valves 20 and 31 and the dash-pot switch 66 are shown diagrammatically in order to best describe the electrical circuit for operating the apparatus 10.

*Electrical*

The electrical circuit includes a pair of main leads 74 and 75 connected through a master switch and fuse box 76 to a suitable voltage source. The lubricant level limit switch 77 for disabling the electrical circuit includes a pair of normally closed contacts 77a through which the main lead 75 is connected, and a pair of normally open contacts 77b adapted to be closed when the normally closed contacts 77a are opened. One of the contacts 77b is also connected to one side of the voltage source by main lead 75 and the other contact 77b is connected to main lead 74 by a lead 82. An indicator light 83 is connected into the lead 82 to show when the circuit is inoperative and the supply of lubricant in the reservoir 11 must be replenished. Therefore, when the switch 77 is operated, the main leads 74 and 75 are shorted out through the normally open contacts 77b and the light 83 and the electrical circuit is disabled.

The main leads 74 and 75 are connected to the ends of a primary coil 84a of a step-down transformer 84. The secondary coil 84b of the transformer 84 is connected by a lead 85 to the mercury pot 67 and by a lead 85' to one end of the coil 71a of the relay 71, the other end of the relay coil 71a being connected to the silver bar 69 by a lead 86. Therefore, when a low weight of lubricant is measured and the contacts 67 and 69 are closed, the relay 71 will be energized so that normally closed contacts 71b will be opened and normally open contacts 71c will be closed, as will become apparent hereinafter.

As previously described, the interrupted alternate energization of the right and left-hand solenoids 25 and 26 effects the rightward and leftward movement of the piston assembly 54 in the cylinder 14. The normally open limit switches 60, 60' and 61, 61' are provided to assure that the piston assembly 54 moves to the end of its stroke before the solenoid 25 or 26 can be energized. Accordingly, one contact 60' and 61' of the limit switches is connected to the main lead 74 by a lead 87, and the other contacts 60' and 61' of the limit switches are connected to one side of the solenoids 25 and 26, respectively, by leads 88 and 88'. The other sides of the solenoids 25 and 26 are connected in parallel to a reference point 89 by a lead 89a. One side of the reject switch 65' is connected by a lead 89b to the reference point 89, and the other side of the reject switch 65' and one side of the reject light 73 are connected by a lead 90 to one of the normally open contacts 71c of the relay 71. The other contact 71c and one of the contacts 71b are connected to the main lead 75 by a lead 91, the other side of the reject light 73 being connected to the main lead 74 by a lead 92. It is therefore apparent that when the dash-pot switch 66 is closed by a low weight of lubricant in the measuring cylinder 14 so that the relay 71 is energized, a circuit for the energization of one of the solenoids 25 or 26 is provided from the main lead 75 through lead 91, the contacts 71c, and the lead 90 to the reject switch and light 65' and 73. The reject light 73 is connected directly to the other main lead 74 by the lead 92 so that as soon as the dash-pot switch 66 closes, the reject light 73 lights. The reject switch 65' is connected through lead 89b to the reference point 89 and through lead 89a to the solenoids 25 and 26, which are connected in parallel through the limit switches 60' and 61' and lead 87 to the other main lead 74. Therefore, when the piston assembly 54 completes its stroke (rightward), the contacts 60' of the left-hand limit switch are closed and the solenoid 26 is conditioned for energization upon closing the reject switch 65'.

When a full load of lubricant is measured or during normal operation, energization of the solenoids 25 and 26 is dependent upon the manual operation of the control unit 64, the reject switch 65' being inoperative inasmuch as the dash-pot switch contacts 67 and 69 are open and the relay coil 71 is unenergized. Therefore, the circuit for the reject switch 65' and light 73 through the normally open contacts 71c to the main lead 75 is broken.

It is presently contemplated that the fixtures 12 and 13 be connected to the outlet of the apparatus 10 through the three-way valve 31 and, accordingly, right and left-hand control units 64 and 64A are shown connected into the electrical circuit. Of course, a pair of nozzles 41 may also be connected to the conduits 34 and 35 in place of the fixtures 12 and 13, or a single nozzle 41 may be connected directly to the outlet conduit 29 as disclosed hereinbefore. The right and left-hand control units 64 and 64A shown in Fig. 3 are provided for operating the electrical circuit to energize the solenoid 25 or 26. The right-hand control unit 64 also controls the energization of the solenoid 37 for discharging lubricant through the fixture 12, and the left-hand control unit 64A controls the energization of the solenoid 38 of the three-way valve 31 for discharging lubricant through the fixture 13.

Each of the control units also includes a control light 72. The control lights 72 are connected in parallel, one side of the lights being connected to the reference point 89 by a lead 89c and the other side of the lights 72 being connected by a lead 93 to the contact 71b that is normally closed with the contact 71b connected through lead 91 to main lead 75. Therefore, when the limit switch 60' or 61' is closed, the control lights 72 will be lighted immediately and the solenoids 25 and 26 will remain unenergized as long as they are lighted. A lead 89d is connected between the reference point 89 and one contact 94a of a normally open pair of contacts in a main relay 94. The other contact 94a is connected by a lead 95 to the main lead 75. When the coil 94b of the main relay 94 is energized, the control lights 72 are shorted out by the circuit through lead 89d, the contacts 94a of the relay 94 and lead 95 to the main lead 75. Therefore, energization of the main relay coil 94b is effective to energize the solenoid 25 or 26 whereby the next stroke of the piston assembly 54 in the measuring cylinder 14 will be started. The main relay 94 also includes hold contacts 94c for maintaining the relay coil 94b energized until the piston assembly 54 starts its stroke and the contacts 60' or 61' are opened whereby the proper operation of the four-way valve 20 is assured. The energization of the main relay coil 94b is effected by operating one of the control units 64 or 64A, which also energizes one of the solenoids 37 or 38 of the valve 31 so that lubricant is delivered to one of the fixtures 12 or 13, as previously seen.

Referring to Fig. 4 it will be seen that each of the control units 64 and 64A includes left and right-hand sets of micro-switches 96 each of which has a pair of normally closed contacts 96a and a pair of normally open contacts 96b. One of each of the contacts 96a and 96b is fixed and the other contacts 96a and 96b are mounted for movement on a common spring element 96c, which may be mechanically coupled to a trip arm 97. A toggle 98 is movable between the sets of micro-switches 96 into alternate contact with the trip arms 97 whereby the pressure of the toggle 98 against the trip arm for each micro-switch will cause the spring element 96c to close the normally open contacts 96b and to open the normally closed contacts 96a. The contacts of the micro-switch 96 not affected by the toggle 98 will remain in normal position until the toggle is thrown against the trip arm 97, therefore, at which time the condition of the contacts of the micro-switches 96 will be reversed, as will appear hereinafter.

A control relay 99 is provided for each of the micro-switches 96 and includes a relay coil 99a, and upper and lower sets of normally open contacts 99b and 99c, respectively. As will become apparent hereinafter, only one of the relays 99 will be energized and in condition to operate the apparatus 10 for each throw of the toggle 98.

The electrical circuit also includes a pair of secondary relays 100 and 100A, which are associated with the control units 64 and 64A, respectively. Accordingly, the secondary relays 100 and 100A are also associated with the solenoids 37 and 38 of the valve 31.

As previously described, the right and left-hand limit switches for the measuring cylinder 14 also include normally open contacts 60 and 61, respectively, which are alternately closed by the trip plates 62 and 63 at the end of the piston assembly stroke in opposite directions. One of each of the contacts 60 and 61 are connected to the main lead 74 by the lead 87, and the other of each of the contacts 60 and 61 are connected in parallel to a lead 101 to a first side of the coil 94b for the main relay 94. Also connected between the other contacts 60 and 61 and the first side of the relay coil 94b (or at a common point with the lead 101) are leads 102, 103 and 104. The lead 102 is connected to one side of each of the coils 99a for the control relays 99, the lead 103 is connected to one side of each of the coils 100a for the secondary relays 100 and 100A, and the lead 104 is connected to one side of each of the solenoids 37 and 38 for the valve 31.

As stated hereinbefore, a control relay 99 is associated with each of the micro-switches 96, and one side of each relay coil 99a is connected through the limit switch contacts 60 or 61 to the main lead 74. The other side of each relay coil 99a is connected by a lead 105 to the normally closed fixed contact 96a of the associated micro-switch 96. The normally open fixed contact 96b of each micro-switch 96 is connected by a lead 106 to one of the normally open lower contacts 99c of the associated control relay 99. The other contacts 99c of each relay 99 for the control unit 64 are connected in parallel by a lead 107 to one side of the solenoid 37, and also by a lead 108 to one side of the coil 100a of the secondary relay 100. Similarly, the other contacts 99c of each relay 99 for the control unit 64A are connected in parallel by a lead 109 to one side of the solenoid 38, and also by a lead 110 to one side of the coil 100a of the secondary relay 100A. The other sides of the solenoids 37 and 38 are connected in parallel by the lead 104 to the lead 101, and the other sides of the secondary relay coils 100a are connected in parallel by the lead 103 to the lead 101, as just described.

The movable contacts 96a and 96b in each micro-switch 96 for the control unit 64 are connected in parallel by a lead 111 to a contact 100b of a normally closed set in the secondary relay 100A. The other contact 100b of the relay 100A is connected by a lead 112 to the lead 93, which is connected to the main lead 75 through the normally closed contacts 71b and lead 91 during normal operation. Similarly, the movable contacts 96a and 96b in each micro-switch 96 for the control unit 64A are connected in parallel by a lead 113 to a contact 100b of a normally closed set in the secondary relay 100. The other contact 100b of this set is connected in parallel by a lead 112' with the contact 100b in the relay 100A to the lead 93. As will presently appear, the coil 100a of the secondary relay 100 or 100A is energized by operating the control unit 64 or 64A, respectively. Therefore, it is apparent that as soon as one of the control units is operated and its associated secondary relay is energized, the normally closed contacts 100b thereof will open and the other control unit will be rendered inoperative.

When the piston assembly 54 is at the end of its rightward stroke in the measuring cylinder 14 so that the limit switch contacts 61 and 61' are closed, a circuit is provided from the main lead 74 through the lead 87, contacts 61, and leads 101 and 102 to the micro-switch relay coils 99a. With the toggle 98 of each of the control units 64 and 64A in contact with the right-hand trip arms 97 so that the normally open contacts 96b of the right-hand micro-switch for each control unit are closed, the circuits for the associated or right-hand relay coils 99a through these switches are broken. However, a circuit for the energization of the left-hand relay coil 99a of the control unit 64 is provided through the lead 105, normally closed contacts 96a of the left-hand micro-switch 96, lead 111, normally closed contacts 100b of the secondary relay 100A, leads 112 and 93, normally closed contacts 71b and lead 91 to the main lead 75. Similarly, a circuit for the energization of the left-hand relay coil 99a of the control unit 64A is provided through the lead 105, normally closed contacts 96a of the left-hand micro-switch 96, lead 113, normally closed contacts 100b of the secondary relay 100, leads 112', 112 and 93, normally closed contacts 71b and lead 91 to the main lead 75. Therefore, when the toggles 98 of the control units are in contact with the trip arms 97 of the right-hand sets of micro-switches 96 and the piston assembly 54 completes its stroke so that the limit switches are closed, the left-hand control relay coils 99a are energized through the normally closed contacts 96a of the left-hand micro-switches 96 of the control units.

When the relay coils 99a are energized, the upper and lower contacts 99b and 99c are closed. The upper contacts 99b are hold contacts one of which is connected to the side of the coil 99a opposite to the lead 102, and the other contacts 99b of all the relays are connected in parallel by leads 114 through the lead 93 to the main lead 75. Once the relay coil 99a is energized it will be maintained in that condition through the hold contacts therefor as long as the limit switch contacts 60 or 61 are closed.

The lower relay contacts 99c of the micro-switch 99 for the control unit 64 are closed so that the circuits to the solenoid 37 and the secondary relay 100 will be completed through the normally open contacts 96b of the micro-switch 96 when the toggle 98 of the control unit 64 is thrown. The energization of the solenoid 37 is effective to move the armature 36 of the valve 31 into position to feed the lubricant to be discharged through the fixture 12, and the energization of the coil 100a of the secondary relay 100 opens the contacts 100b so that the control unit 64A is inoperative.

Similarly, the circuits to the solenoid 38 and the secondary relay 100A are closed by throwing the toggle 98 of the control units 64A. The energization of the solenoid 38 is effective to move the armature 36 of the valve 31 into position to feed the lubricant to be discharged through the fixture 13, and the energization of the coil 100a of the secondary relay 100A opens the contacts 100b so that the control unit 64 is inoperative. As previously seen, only one control unit can be operated effectively at the end of any stroke of the piston assembly 54.

The secondary relays also include upper and lower sets of normally open contacts 100c and 100d, which are closed by the energization of the secondary relays. The lower contacts 100d are hold contacts for maintaining the secondary relay coil 100a energized until the limit switch contacts 60 or 61 are opened. One of the upper contacts 100c of the secondary relays 100 and 100A are connected by the leads 112 and 112' to the lead 93 which is connected through the contacts 71b of relay 71 and lead 91 to the main lead 75. The other upper contacts 100c are connected in parallel by leads 115 and 115' to the side of the main relay coil 94b opposite to the lead 101, which connects the coil 94a through the limit switch contacts 60 or 61 to the main lead 74. Therefore, the energization of the secondary relay coil 100a completes the circuit for the main relay 94 through the contacts 100c of the secondary relay. The main relay 94 effects the energization of the solenoid 25 or 26 by shorting out the control unit ready lights 72 through the contacts 94a.

A latch trip-type counter 116 is also provided for keeping accurate count of the number of times lubricant is discharged by operating the control units. The counter is connected by a lead 117 to the lead 101 or to one side of the limit switch contacts 60 and 61, and by a lead 118 to the lead 115 connected through the normally open upper contacts 100c to the main lead 75. Therefore, the counter is only actuated by operation of the control units so that when an insufficient amount of lubricant is discharged into a suitable container (not shown) by operating the reject switch 65', the counter will not register that operation.

The switches 96 of the control units 64 are operative on either throw of the toggle 98, and the hold contacts for each of the relays assures that the coils of these relays will remain energized until the circuit is broken by the movement of the piston assembly 54 on the next stroke in the measuring cylinder 14. The electrical circuit remains inoperaitve during the movement of the piston assembly 54 and until the end of the stroke when the contacts of the limit switch at one end of the measuring cylinder 14 are closed. The electrical circuit is then conditioned for operation as soon as the switch in the control unit 64 or reject unit 65 is thrown.

It is now apparent that a device for measuring predetermined amounts of lubricant both by volume and by weight has been provided, and that electrical means for controlling and operating the device have also been provided. If desired, remote control units 64 and reject units 65 may be connected in parallel for operating the apparatus 10, especially when nozzles 41 are employed for lubricating railroad car journal boxes.

It is to be understood that the foregoing description and the accompanying drawings have been given only by way of illustration and example, and that changes and alterations in the present disclosure, which will be readily apparent to all skilled in the art, are contemplated as within the scope of the present invention, which is limited only by the claims which follow.

What I claim is:

1. In a system for measuring a predetermined amount of lubricant including a cylinder having opposite ends and a piston reciprocable between said ends, a reservoir containing lubricant, a valve having a first port connected to the reservoir means, dispensing means connected to a second port of said valve, said valve being adapted to alternately connect said reservoir and dispensing means with opposite ends of the cylinder, and weighing means carrying said cylinder; an electrical circuit including solenoid means for actuating the armature of said valve to alternately connect the opposite ends of said cylinder to said reservoir and dispensing means, a manually operable control switch for energizing said solenoid means when a predetermined amount of lubricant is measured, a manually operable reject switch for energizing said solenoid means when less than a predetermined amount of lubricant is measured, and relay means responsive to the weighing means for rendering only one of said control and reject switches operable and the other inoperable.

2. The electric circuit according to claim 1 wherein indicator means are associated with said control and reject switches for indicating which of them is operable when the piston is positioned at one end of the cylinder.

3. In combination; a lubrication system for measuring a predetermined volume of lubricant, comprising a reservoir containing a supply of lubricant, a measuring cylinder having opposite ends and a piston assembly movable therein between said ends, a dispensing nozzle adapted to discharge lubricant from said measuring cylinder, a valve having an inlet port connected to said reservoir and an outlet port connected to said dispensing nozzle, said valve having first and second intermediate ports connected to opposite ends of said measuring cylinder and an armature movable to alternately connect said inlet and outlet ports with said first and second intermediate ports whereby said reservoir and dispensing nozzle are alternatley connected with opposite ends of said measuring cylinder, a scale having a platform carrying said measuring cylinder; and an electrical circuit including solenoid means for moving said armature in said valve, a control switch for effecting the energization of said solenoid when a predetermined volume of lubricant is measured by said measuring cylinder, and another switch associated with said scale for rendering said control switch inoperative when less than a predetermined volume of lubricant is measured by said measuring cylinder.

4. The combination according to claim 3 wherein said electrical circuit includes a reject switch for effecting the energization of said solenoid means when said control switch is inoperative.

5. In a system for measuring a predetermined amount of lubricant by volume and weight including a volume measuring cylinder having opposite ends and a piston reciprocable between said ends, a reservoir containing lubricant, a valve having a first port connected to the reservoir means, dispensing means connected to a second port of said valve, said valve being adapted to alternately connect said reservoir and dispensing means with opposite ends of the cylinder, and weight measuring means carrying said cylinder and balanced to a predetermined weight of lubricant and the cylinder; an electrical circuit including solenoid means for actuating the armature of said valve to alternately connect the opposite ends of said cylinder to said reservoir and dispensing means, and normally open switch means for energizing said solenoid means when the predetermined weight of lubricant is measured, and other switch means for energizing said solenoid when less than the predetermined weight of lubricant is measured.

6. In an apparatus of the character described for measuring lubricant by volume and weight, in combination with a lubrication system including a source of lubricant supply, a volume measuring cylinder having first and second ends and a piston assembly movable therebetween on successive strokes during each of which lubricant is simultaneously measured in the cylinder and a previously measured amount of lubricant is discharged from said cylinder, a dispensing fixture, a conduit system interconnecting said source of lubricant supply to said cylinder and said cylinder to said fixture, an electrically operated valve disposed in said conduit system to control lubricant flow from said source to said first end of said cylinder and from said second end of said cylinder to said fixture, said valve being adapted to be reversed to control lubricant flow from said source to said second end of said cylinder and from said first end of said cylinder to said fixture, weight measuring means associated with said cylinder for conjoint predetermination of the amount of lubricant to be dispensed: an electrical circuit for operating said lubrication system comprising first and second switches positioned at said first and second ends respectively of said cylinder and adapted to be alternately closed by said piston assembly at the ends of successive strokes in said cylinder; first and second solenoids connected to said first and second switches respectively for alternate energization to reverse said valve; a third switch mounted on said weight measuring means and adapted to close in response to a predetermined low weight of lubricant in said cylinder; a fourth switch connected to each of said first and second solenoids and adapted to effect the energization thereof when said third switch is closed, fifth and sixth switches associated with said first and second switches to be alternately closed by said piston assembly; a relay having normally open contacts the closing of which is adapted to energize one of said first and second solenoids when said third switch is open, the coil of said relay being connected to each of said fifth and sixth switches; and other switch means adapted to energize said relay coil when said third switch is open whereby one of said first and second solenoids is energized through the contacts of said relay.

7. In an apparatus of the character described for measuring lubricant by volume and weight, in combination with a lubrication system including a source of lubricant supply, a volume measuring cylinder having first and second ends and a piston assembly movable therebetween, first and second dispensing means, a conduit system interconnecting said source of lubricant supply to said volume measuring cylinder and said volume measuring cylinder to one of said first and second dispensing means, a first electrically operated valve disposed in said conduit system to selectively control lubricant flow from said volume measuring cylinder to one of said first and second dispensing means, a second electrically operated valve disposed in said conduit system to control lubricant flow from said source to said first end of said volume measuring cylinder and from said second end of said volume measuring cylinder to said first valve, said second valve being adapted to be reversed to control lubricant flow from said source to said second end of said volume measuring cylinder and from said first end of said volume measuring cylinder to said first valve, weight measuring means associated with said volume measurng cylinder for conjoint predetermination of the amount of lubricant to be dispensed: an electrical circuit for operating said lubrication system comprising first and second switches positioned at said first and second ends of said volume measuring cylinder and adapted to be alternately closed by said piston assembly at opposite ends of the movement thereof, the closing of one of said first and second switches conditioning said electrical circuit for operation; first and second solenoids connected to said first and second switches respectively for alternate energization to reverse said second valve; a third switch mounted on said weight measuring means and adapted to be closed in response to a predetermined low weight of lubricant measured in said volume measuring cylinder; a fourth switch connected to each of said first and second solenoids and adapted to effect the energization thereof when said third switch is closed; fifth and sixth switches associated with said first and second switches to be alternately closed by said piston assembly; a relay having normally open contacts the closing of which is adapted to energize one of said first and second solenoids when said third switch is open, the coil of said relay being connected to each of said fifth and sixth switches; third and fourth solenoids connected to each of said fifth and sixth switches and adapted to control the operation of said first valve for selectively controlling lubricant flow to one of said first and second dispensing means; and other switch means for simultaneously energizing one of said third and fourth solenoids and said relay coil when said third switch is open whereby one of said first and second solenoids will be energized through the contacts of said relay.

8. The electrical circuit according to claim 6 wherein a counter is connected in parallel with said relay coil and is actuated simultaneously therewith by said other switch means.

9. In an apparatus of the character described for measuring lubricant by volume and weight, a volume measuring cylinder, a piston reciprocally mounted in said cylinder, a four-way valve, inlet and outlet conduits connected to said valve, other conduits connected between said valve and opposite ends of said cylinder, solenoid means for actuating said valve to alternately connect said inlet and outlet conduits with opposite ends of said cylinder through said other conduits; weight measuring means having said volume measuring cylinder mounted thereon, said weight measuring means being balanced to a predetermined weight including the weight of said cylinder and the weight of a predetermined amount of lubricant measured by said cylinder; and an electrical circuit for energizing said solenoid means to actuate the valve including a control switch adapted to complete the electrical circuit to the solenoid means when the predetermined amount of lubricant is measured, a reject switch adapted to complete the electrical circuit to the solenoid means when less than the predetermined amount of lubricant is measured, and means on said weight measuring means for rendering only one of said control and reject switches operable and the other inoperable.

References Cited in the file of this patent
UNITED STATES PATENTS

| | | |
|---|---|---|
| 1,932,976 | Lamb | Oct. 31, 1933 |
| 2,048,003 | Hawks | July 21, 1936 |
| 2,392,017 | Wedeberg | Jan. 1, 1946 |
| 2,600,178 | Acker | June 10, 1952 |